INVENTOR.
RICHARD L. GOWAN

3,438,019
DATA GATHERING SYSTEM
Richard L. Gowan, Coronado, Calif., assignor to the United States of America as represented by the Secretary of the Navy
Filed Oct. 11, 1965, Ser. No. 494,990
Int. Cl. G08b *19/00;* H04g *3/04*
U.S. Cl. 340—214                                   3 Claims

ABSTRACT OF THE DISCLOSURE

Parameters, such as voltages, in an equipment to be tested are converted in situ to series of pulses, the repetition rates being functions of the parameters. The pulse series are successively gated to a single long line to a remote computer. A signal pulse at the computer indicates completion of readout of one series and triggers the gate for the next series.

---

The invention described herein may be manufactured and used by or for the Government of the United States of America for governmental purposes without the payment of any royalties thereon or therefor.

This invention relates to automatic test equipment and is particularly directed to means for sequentially measuring a large number of electrical or physical parameters, and usefully gathering the data thus measured.

Electronic equipment such as communication, radar and fire control systems of a typical navy ship is so complex that the effectiveness of the equipment is limited by the dexterity of the crew in testing and servicing the equipment. Because of the large number of active circuits in some electronic centers, the probability of failure of one or more vital circuits is high. To reduce the downtime it has been attempted to systematically sample voltages only at key test points. The permissable number of test points is limited to some extent by the number of conductors to the control centers which can be tolerated. Time multiplexing is cumbersome and often cannot be used because of space limitations, to alleviate the problem of test lines to and from the control center.

A more difficult aspect of automatic test equipment is the technique of processing each sampled voltage. Low impedance test circuits cannot generally be connected to high impedance circuits.

Further, in the use of conventional multiplexing systems, the use of highly regulated power supplies is mandatory, if the integrity of the sampled analog voltages is to be preserved for testing purposes. Accordingly, one object of this invention is to eliminate the difficulties associated with conventional analog multiplexing schemes. This object is accomplished as will be seen, by conversion of the analog voltage of interest to a nonlinear signal of a binary nature. Each non-linear signal is selected in turn by computer control. It will be seen that the system has greatly simplified power supply requirements, a single direct current supply of non critical nature with $\mp 10\%$ of nominal supply voltage is easily tolerated. The test points can be changed at megacycle rates. The system is free from linearity considerations as it is required to handle only nonlinear binary type signals as a result of the conversion process to be described.

Another object of this invention is to effectively measure test voltages and to transmit the test information to a control center.

A further object of this invention is to receive the test information at a control center and to intelligently interpret the meaning of the information.

The objects of this invention are attained by placing a sensor and a voltage-to-frequency converter at the site of the test point. By microminiaturization techniques it is now possible to construct sensors and V-to-F converters on boards of postage stamp size. The output of each converter is gated to a single line which transmits the frequency information of the binary signal to the control center. There, the frequency is easily measured and compared with high and low standards predetermined for that particular test point. For these purposes a general purpose digital computer is well suited. After finding the test information to be between the high and low limits, a command signal is sent to operate the gate structures and to process the sample at the next test point. If a signal is outside of limits an appropriate alarm circuit is operated. Ideally, the general purpose computer can be programmed to indicate the rate of deterioration of a test voltage over any selected period of time. At ordinary clock frequencies it is possible to call for and process test voltages from any thousands of test points in milliseconds, and it is possible for the operation at the control center to instantly determine the condition of operability of a ship-wide electronic system.

Other objects and features of this invention will become apparent to those skilled in the art by referring to the specific embodiment described in the following specification and shown in the accompanying drawing in which.

Figure 1:
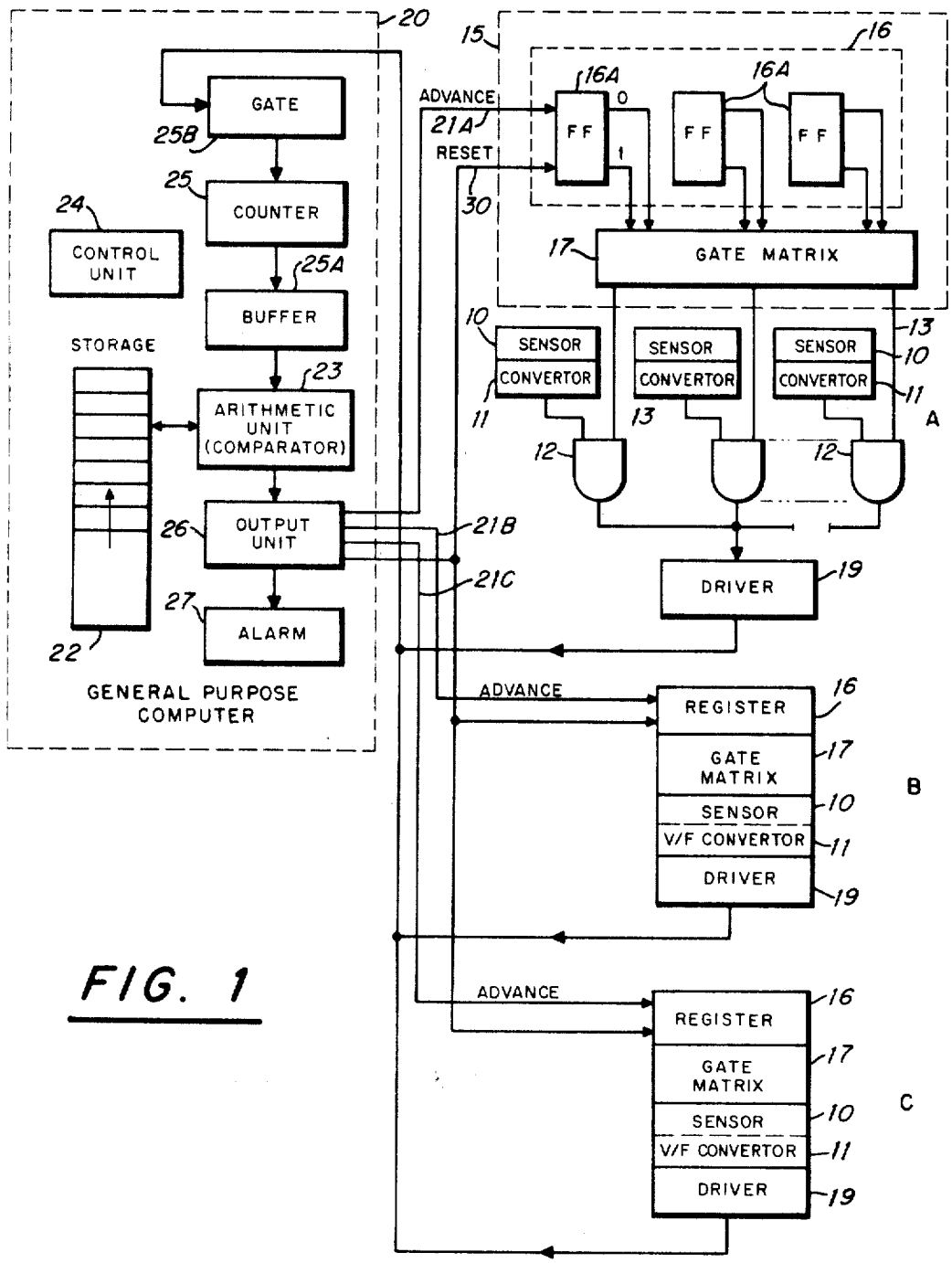
FIG. 1 is a block diagram of the data gathering system of this invention.

The sensors 10 shown in FIG. 1 are transducer devices which will convert the electrical or physical quantities to be tested into voltages. It is contemplated that at the site of each sensor will be a converter 11 for converting the analog voltage produced by the sensor into a continuous series of pulses, the repetition frequency of which is a function of the magnitude of the measured variable quantity. It is significant in this invention that the output of the voltage-to-frequency converter is a binary voltage the two absolute values of which are unimportant but the pulse frequency of which is all important. It is contemplated further that the sensor and the converter be of minute size, as stated, so that they can be permanently installed at each test site. If then, battery voltage is supplied, the converter can operate continuously. That is, the output conductor of the converter always contains the binary voltage the frequency of which may at any instant be sampled without disturbing the equipment under test.

The output of each converter is passed through the gate 12, which is controlled on and off by a direct current voltage on line 13 from the commutator 15. The enabling voltage appears on only one line 13 at a time which means that the frequency outputs of the converters 11 may be time multiplexed into the input terminals of the line driver amplifier 19. The driver 19 is simply an amplifier of sufficient power to reliably transmit the signal from the test location to the remote test center shown diagrammatically within the dotted box at the left of FIG. 1. The control center comprises the general purpose computer 20.

The commutator 15 for successively applying enabling pulses to control lines 13 may, for example, comprise the register 16 which may have two, three or more flip-flop stages 16a. The flip-flop stages are cascaded in the usual shift register fashion so that each pulse arriving on line 21A from the general purpose computer 20 produces a shift in the register and creates a new set of 0's and 1's on the output leads of the flip-flop stages. Gate matrix 17 is merely an array of AND circuits for combining the 1's and 0's of the flip-flops to produce an enabling pulse on a selected one of the output lines 13 for each unique combination of 0's and 1's.

The computer 20 of this invention is of the general purpose type in that it has conventional components including the storage facilities 22, a arithmetic operating unit 23, logic circuitry 24 for control and programming, and an input circuit for feeding digital information in a form understood by the computer. The output circuit of the computer has special capabilities, as will appear. The storage 22 of the computer preferably contains test standards for each test point. That is, voltages at the test points each has upper and lower limits the equivalent values of which are stored at discrete addresses in the memory 22. Each address is easily identified with one test point by means of the control circuits. The storage device may comprise a tape or a rotating drum or a magnetic core matrix or any combination of these. A preferred characteristic of the memory is that it have relatively short access time and can, upon command, deliver to the arithmetic unit the upper and lower limits stored at any address.

The signal on line 19A from the test point to the computer is fed first to means for measuring the repetition rate of the pulse train. For this purpose the counter 25 is employed. A timed gate 25B is coupled ahead of the counter 25 for precisely measuring a period of time during which the pulses are admitted to the counter. It follows that the counter content is a function of pulse frequency. The contents of the counter can be stored in the buffer 25A and at the appropriate time can be fed into the arithmetic unit 23. There the count is compared in value to the upper and lower limits supplied from the appropriate address in memory 22. If the count from the test signal is within limits the output circuit 26 responds by sending a new command pulse over advance line 21A to the register 16 for enabling the next sensor 10 and its gate 12. If on the other hand the signal under test falls outside the prescribed limits a suitable alarm 27 is operated. Alternatively, and preferably, a process is initiated by the alarm signal to initiate corrective action.

Figure 2:
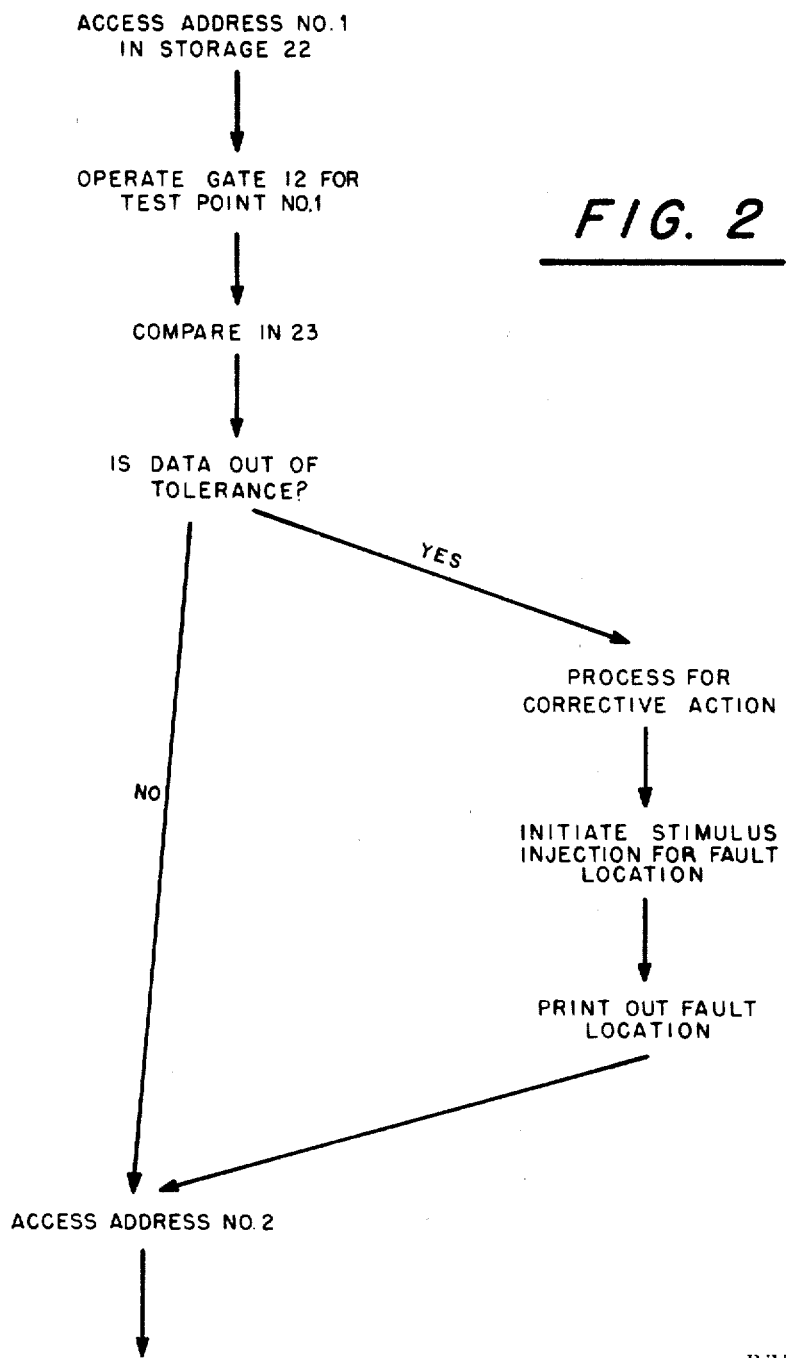
FIG. 2 is a flow diagram of one program for the general purpose computer of FIG. 1.

Reference to the flow diagram of FIG. 2 will serve to illustrate one typical program for the computer which might be employed in the system of FIG. 1. Let it be assumed that access to address No. 1 is established and that the signal from the first sensor 10 corresponding to address No. 1 is to be processed. The upper and lower limits for test point No. 1 stored at address No. 1 are read out to the arithmetic unit 23. Simultaneously a command signal on line 21 operates the commutator 15 to apply an enabling pulse to the line 13 of test point No. 1. Next the signal No. 1 is received at the control center and is compared with the limits obtained from the memory. Next, it must be determined whether the data is outside the tolerances. If the answer is "no" the test signal is not out of tolerance then address No. 2 is initiated and the next test cycle is started. If, however, the answer is "yes" the data is out of tolerance then the process for corrective action is initiated. Initiation may comprise generation of a stimulus voltage which can be injected for fault localization, as disclosed, for example, in the copending application Ser. No. 623,524, filed Mar. 14, 1967.

Preferably the fault location is printed out before an enabling signal on line 21A derived to permit the limits of the next address to be fed to the memory.

According to a further feature of this invention, the test points may be arranged in groups. The groups A, B and C of sensors may conveniently be arranged at the principal centers of activity of the electronic equipment being tested. After the advance command signals on line 21A has enabled all of the sensor-converters 10, 11 of station A, the register 16 may be reset by a one or zero on line 30. Thereupon advance signals on line 21B successively enables the sensors' converters 10, 11 of station B. Likewise completion of tests of station B permit the testing of the sensors at station C.

It would, of course, be a simple matter to program the general purpose computer so as to eliminate some selected ones of the sensors, or to test one sensor more frequently than others.

The voltage-to-frequency converter may comprise a cross-coupled multivibrator, with the variable resistance of a transistor, responsive to the voltage to be measured, connected in one of the RC time constant circuits of multivibrator. Such a converter is particularly stable in the face of large DC power voltage changes and the frequency at the output is particularly reliable in indicating the analog voltage applied to the input. The transmission lines 19 and 21 may be of any length and the amplitude of the pulse train applied to the counter 25 may vary widely without effecting the output of the counter.

Obviously many modifications and variations of the present invention are possible in the light of the above teachings. It is therefore to be understood that within the scope of the appended claims the invention may be practiced otherwise than as specifically described.

What is claimed is:

1. In combination in automatic test equipment for sampling the magnitude of a plurality of variable quantities,
   a plurality of sensors for sampling, respectively, the magnitude of said quantities at a plurality of test points and producing analogous voltages,
   a plurality of pulse generators, said generators being placed immediately adjacent said sensors, and being responsive, respectively, to said analogous voltages for generating continuous series of pulses the repetition rates of which are functions of said voltages,
   a common transmission line,
   gates with control circuits responsive to command pulses for selectively coupling, respectively, the outputs of said generators to the near end of said common transmission line,
   a remote general purpose-type computer having storage facilities with stored predetermined test voltage limits, respectively, at different addresses, arithmetic comparing circuits, and logic circuits for programming and control,
   the remote end of said transmission line being coupled to said arithmetic comparing circuit for applying pulses from a selected one of said pulse generators to said arithmetic circuit, said logic circuits being so programmed as to compare, the selected test pulse with one set of predetermined test voltage limits, and
   means coupled between the output of said comparing circuit and said control circuits for enabling another of said gates in response to signals from said comparing circuit.

2. In the automatic test equipment defined in claim 1,
   a counter and a gate coupled between said transmission line and the input of said comparing circuit, and
   means for closing said gate a predetermined period of time so that the contents of said counter will indicate repetition rate of pulses on said transmission line.

3. In the automatic test equipment defined in claim 1, the mentioned command-responsive control circuit comprising,
   a shift register having a plurality of cascaded flip-flops for generating a unique set of logical 1's and 0's for each number of command pulses, and
   a matrix coupled to the outputs of said flip-flops for generating a gate-enabling pulse on a different terminal for each command pulse number.

References Cited

UNITED STATES PATENTS

| | | | |
|---|---|---|---|
| 2,883,255 | 4/1959 | Anderson | 340—413 |
| 2,905,520 | 9/1959 | Anderson | 340—413 |
| 3,278,920 | 10/1966 | Sargent | 340—214 |

THOMAS B. HABECKER, *Primary Examiner.*

U.S. Cl. X.R.

340—172.5